United States Patent Office 3,388,089
Patented June 11, 1968

3,388,089
LEATHER TREATING COMPOSITION
Edgar D. Brown, Jr., Schenectady, N.Y., assignor to General Electric Company, a corporation of New York
No Drawing. Filed Sept. 28, 1964, Ser. No. 399,905
4 Claims. (Cl. 260—33.4)

The present invention relates to an organopolysiloxane composition useful for rendering leather water repellent. More particularly, the present invention relates to a composition comprising an organic solvent solution of an alkyl titanate ester and an organopolysiloxane composed of chemically combined arylsiloxy units and trialkylsiloxy units.

The leather treating composition of the present invention comprises (A) an organopolysiloxane composed of chemically combined units of the formula, (1)  $[(R)_3SiO_{.5}] [R'SiO_{1.5}]$ produced by stripping the cohydrolysis product of 1.1 to 3 moles of a trialkylhalosilane of the formula, (2)  $(R)_3SiX$ per mole of an aryltrihalosilane of the formula, (3)  $R'SiX_3$ of volatiles boiling at temperatures to about 300° C. at 1 mm., (B) an alkyl titanate ester of the formula, (4)  $Ti(OR)_4$ and (C) an organic solvent, where there is utilized in said composition from 0.2 to 1 part of (B), per part of (A), and from 2 to 100 parts of (C) per part of (A), R is a monovalent alkyl radical, and R' is a member selected from monovalent aryl radicals and halogenated monovalent aryl radicals.

Radicals included by R of the above formulae are alkyl radicals such as methyl, ethyl, propyl, butyl, pentyl, hexyl, heptyl, octyl etc.; radicals included by R' of the above formulae are aryl radicals and halogenated aryl radicals such as phenyl, chlorophenyl, dichlorophenyl, trichlorophenyl, tetrachlorophenyl, tolyl, xylyl, chloronaphthyl, etc. In the above formulae, where R or R' respectively can represent more than one radical, these radicals can be all the same or they can be different, such as any two or more of the aforementioned R or R' radicals.

The organopolysiloxane composed of the chemically combined units shown by Formula 1 referred to hereinafter as the "organopolysiloxane residue," is preferably represented by the following average formula, (5)  $[(R)_3SiO_{.5}]_y [R'SiO_{1.5}]_{y-2}$ where y is an integer having a value of at least 4, and preferably about 7, and R and R' are as defined above. For example, when R' in Formula 4 represents phenyl, and R is methyl, y is preferably 7. In instances where the molecular weight of R' is larger such as tetrachlorophenyl, y is preferably smaller.

Trialkylhalosilanes included by Formula 2 are for example, trimethylchlorosilane, triethylchlorosilane, tributylchlorosilane, etc.; aryltrihalosilane included by Formula 3 are for example, phenyltrichlorosilane, chlorophenyltrichlorosilane, dichlorophenyltrichlorosilane, trichlorophenyltrichlorosilane, tetrachlorophenyldichlorosilane, tolyltrichlorosilane, etc.

One of the hydrolysis procedures that can be employed to provide for the production of the organopolysiloxane residue is taught by Simmler, Patent 3,012,052. Depending upon the proportions of trialkylchlorosilane, arylchlorosilane, and water utilized, the amount and nature of strippable lower molecular weight copolymers composed of chemically combined trialkylsiloxy units and arylsiloxy units can vary. Experience has shown that improved yields of the organopolysiloxane residue composed of units of Formula 1, can be obtained by the procedure of Simmler, by increasing the mole proportion of aryl chlorosilane and decreasing the mole proportion of water in the hydrolysis mixture.

Alkyl titanate esters included by Formula 2 are for example, tetramethyltitanate, tetraethyltitanate, tetraisopropyltitanate, tetraisobutyltitanate, etc. These titanate esters can be made by reacting a titanium halide with an appropriate aliphatic alcohol in the presence of an acid acceptor.

The leather treating compositions of the present invention can be made by mixing together the organopolysiloxane residue, the alkyl titanate ester, and a suitable organic solvent. The order of addition of the various components of the leather treating composition is not critical. Organic solvents that can be employed are for example, aliphatic alcohols such as ethyl alcohol, isopropyl alcohol, butyl alcohol, etc; hydrocarbon solvents such as toluene, xylene, etc.; halogenated hydrocarbon solvents such as chlorodifluoromethane, etc. Mixtures of such solvents also can be employed.

In order that those skilled in the art will be better able to practice the invention, the following examples are given by way of illustration and not by way of limitation. All parts are by weight.

Example 1

Following the procedure shown in the example of Simmler Patent 3,012,052, a mixture of trimethylchlorosilane, and phenyltrichlorosilane is hydrolyzed. There are added 7 moles of water to a mixture of 5 moles of trimethylchlorosilane and 3 moles of phenyltrichlorosilane over a period of 3 hours. The hydrolysis mixture is constantly agitated during the addition, and hydrogen chloride is continuously evolved. The mixture is heated for an additional hour to expel hydrogen chloride. The mixture is then treated with a sodium bicarbonate solution to completely neutralize residual HCl. After filtering the mixture, the crude product is fractionally distilled. Volatile materials are distilled from the product at temperatures to 300° C. at 1 mm. There remains about a 50% yield of organopolysiloxane residue after the crude product is stripped, based on the calculated weight of the hydrolyzate. Based on method of preparation and its infrared spectrum, its average formula is, $[(CH_3)_3SiO_{.5}]_7 [C_6H_5SiO_{1.5}]_5$ A solution of 25 parts of the above organopolysiloxane residue, 25 parts of tetrabutyl titanate, and 50 parts of ethyl alcohol is agitated. A 6% solution of this mixture is prepared using chlorodifluoromethane as a solvent.

Example 2

The procedure of Example 1 is repeated except that 3 moles of tetrachlorophenylchlorosilane is utilized in place of the 3 moles of phenyltrichlorosilane. The hydrolyzate is stripped to 300° C. at 1 mm. Based on method of preparation, and its infrared spectrum there is obtained organopolysiloxane residue having the average formula, $[(CH_3)_3SiO_{.5}]_4 [C_6HCl_4SiO_{1.5}]_2$ Equal parts of the above organopolysiloxane residue and tetrapropyltitanate are dissolved in sufficient isopropyl alcohol to form a 25% solution.

A variety of suede and top tanned cowhide leather articles, including shoes, are sprayed with the treating composition of Example 1. Similar leather articles are also sprayed with a 6% leather treating composition consisting of a solution in Stoddard solvent of a leather treating composition shown by Currie Patent Re. 23,879. A composition is used corresponding to mixture 13 of Example 1 of the Currie patent. The treated leather articles are allowed to air dry for 24 hours.

In the table below there is shown the results obtained with the "Curry" composition and the composition of the invention "M.T." "Shine" indicates the degree of luster imparted to the treated leather shoes as compared to a standard shoeshine. "Uniformity" shows the average apparance of the surface of treated leather samples with respect to whether the treated samples are free of streaks, similar in general appearance, etc. "White Spots" indicates that the treating composition leaves tiny imperfections on the surface of the leather that are white in color.

|       | Shine         | Uniformity    | White Spots |
|-------|---------------|---------------|-------------|
| Curry | Satisfactory  | Satisfactory  | Yes.        |
| M.T   | Superior      | Superior      | No.         |

Based on the above showing, those skilled in the art would know that the leather treating compositions of the present invention provide for significant advantages over leather treating compositions of the prior art. For example, the table shows that the leather treating composition of the present invention can be employed to treat various types of leather both finished and unfinished. If the treated leather is allowed to air dry at room temperatures, a high luster is produced on the surface of the leather. The treated leather is also free of unsightly streaks and spots and is generally uniform in appearance.

While the above examples have of necessity been limited to only a few of the very many variables within the scope of the present invention, it should be understood that the present invention is directed to the production of a much wider variety of leather treating compositions which can be produced by mixing together a residue composed of units shown by Formula 1 in combination with a titanate ester shown by Formula 4 and an organic solvent.

What I claim as new and desired to secure by Letters Patent of the United States is:

1. A composition which consists essentially of (1) an organpolysiloxane free of volatiles boiling at temperatures up to 300° C. at 1 mm. of the formula, $$[(R)_3SiO_{.5}]_y \ [R'SiO_{1.5}]_{y-2}$$

(2) an alkyl titanate ester of the formula, $$TI(OR)_4$$

and (3) an organic solvent, where there is utilized in said composition by weight from 0.2 to 1 part of (2) per part of (1), and from 2 to 100 parts of (3) per part of (1), $y$ is an integer having a value between 4 to 7, inclusive, R is a monovalent alkyl radical having from 1 to 8 carbon atoms, and R' is a member selected from the class consisting of phenyl, chlorophenyl, dichlorophenyl, trichlorophenyl, tetrachlorophenyl, tolyl, xylyl, and chloronaphthyl.

2. A composition which consists essentially of (1) an organopolysiloxane having the formula, $$[(CH_3)_3SiO_{.5}]_7 \ [C_6H_5SiO_{1.5}]_5$$

(2) tetrabutyltitanate, and (3) an organic solvent, where there is utilized in said composition by weight from 0.2 to 1 part of (2) per part of (1), and from 2 to 100 parts of (3) per part of (1).

3. A composition which consists essentially of (1) an organopolysiloxane having the formula, $$[(CH_3)_3SiO_{.5}]_4 \ [C_6HCl_4SiO_{1.5}]_2$$

(2) tetrabutyltitanate, and (3) an organic solvent, where there is utilized in said composition by weight from 0.2 to 1 part of (2) per part of (1), and from 2 to 100 parts of (3) per part of (1).

4. A composition in accordance with claim 1, where the organic solvent is an aliphatic alcohol.

References Cited

UNITED STATES PATENTS

| 2,832,794 | 4/1958 | Gordon | 260—46.5 |
| 2,970,126 | 1/1961 | Brown  | 260—46.5 |

FOREIGN PATENTS

| 580,063 | 7/1959 | Canada. |

OTHER REFERENCES

Freeman, silicones, ILIFFE Books Ltd., 1962 edition, pp. 46–49 relied on.

LEON D. ROSDOL, *Primary Examiner.*

J. T. FEDIGAN, H. B. GUYNN, *Assistant Examiners.*